(12) United States Patent
Parker et al.

(10) Patent No.: US 7,382,356 B2
(45) Date of Patent: Jun. 3, 2008

(54) INPUT UNIT FOR GAMES AND MUSICAL KEYBOARDS

(75) Inventors: Andrew J. Parker, Novato, CA (US); Charles E. Taylor, Punta Gorda, FL (US); Patricia I. Brenner, Encino, CA (US)

(73) Assignee: Sharper Image Corp., San Francisco, CA (US)

( * ) Notice: Subject to any disclaimer, the term of this patent is extended or adjusted under 35 U.S.C. 154(b) by 535 days.

(21) Appl. No.: 10/932,902

(22) Filed: Sep. 2, 2004

(65) Prior Publication Data

US 2005/0057495 A1 Mar. 17, 2005

Related U.S. Application Data

(60) Provisional application No. 60/503,008, filed on Sep. 15, 2003.

(51) Int. Cl.
G09G 5/00 (2006.01)

(52) U.S. Cl. .................. 345/168; 345/156; 345/158; 345/166; 345/170; 84/13; 84/423; 250/332; 250/559.38; 400/472

(58) Field of Classification Search .............. 345/156, 345/158, 166, 167, 168, 170; 84/13, 423, 84/442, 443; 250/332, 559.38; 400/472, 400/489
See application file for complete search history.

(56) References Cited

U.S. PATENT DOCUMENTS

| | | | |
|---|---|---|---|
| 5,196,639 A * | 3/1993 | Lee et al. ............ 84/603 |
| 5,704,836 A * | 1/1998 | Norton et al. ............ 463/36 |
| 6,323,932 B1 | 11/2001 | Zhang et al. ............ 349/155 |
| 6,614,422 B1 | 9/2003 | Rafii et al. |
| 6,740,802 B1 * | 5/2004 | Browne, Jr. ............ 84/609 |
| 6,802,662 B1 * | 10/2004 | Cheng et al. ............ 400/489 |
| 2001/0022574 A1 * | 9/2001 | Hwang ............ 345/156 |
| 2002/0046638 A1 * | 4/2002 | Wright et al. ............ 84/477 R |
| 2002/0061217 A1 * | 5/2002 | Hillman et al. ............ 400/489 |
| 2002/0063775 A1 | 5/2002 | Taylor |
| 2002/0067343 A1 * | 6/2002 | Anderson ............ 345/168 |
| 2002/0140633 A1 | 10/2002 | Fafi et al. |
| 2002/0161586 A1 * | 10/2002 | Wang ............ 704/275 |
| 2003/0034462 A1 * | 2/2003 | Remillard et al. ...... 250/559.38 |
| 2003/0076484 A1 | 4/2003 | Bamji et al. |
| 2003/0212862 A1 * | 11/2003 | James ............ 711/115 |

OTHER PUBLICATIONS

Dunn, Jeremy G. Laser Detector System WO 91/13319; IPD Sep. 5, 1991; IAN PCT/US90/02293.*

* cited by examiner

Primary Examiner—Bipin Shalwala
Assistant Examiner—Vincent E. Kovalick
(74) Attorney, Agent, or Firm—Bell, Boyd & Lloyd LLP

(57) ABSTRACT

A computer game system uses an infrared sensor which produces an infrared light to produce pulse of infrared light. Optics focus reflections from the infrared light pulse from different portions of the environment to different detectors in a 2D array of detectors. The detectors produce indications of the distance of the closest objects. The indications can be used by a processor to determine each action. The determined action can be used as input to a computer game. The infrared sensor can also be used with a musical keyboard system.

20 Claims, 6 Drawing Sheets

INPUT UNIT FOR GAMES AND MUSICAL KEYBOARDS

CLAIM OF PRIORITY

This application claims priority to U.S. Provisional Application 60/503,008 filed Sep. 15, 2003,

FIELD OF THE INVENTION

The present invention relates to input devices for computer games.

BACKGROUND

Computer games covering a wide range of subject matter have become very popular. Examples of computer games include sports games, racing games, strategy games, role playing games, first person shooter games and the like.

A wide range of input devices for computer games have been devised. Some computer games use the computer keyboard as an input device. Many computer games for personal computers use a mouse as the main controller. Console-based games typically use dedicated controller devices having a number of elements, such as buttons and joysticks, to control the computer game.

A number of other controllers have been devised. These controllers include pressure sensor devices for use in dance games and gun-shaped controllers for shooting games.

It is desired to have a new input device for the use of controlling computer games.

BRIEF SUMMARY

One embodiment of the present invention is a computer game system including an infrared sensor. The infrared sensor includes an infrared light source to produce pulses of infrared light, optics to focus reflections from the infrared light pulse from different portions of the environment to different detectors in a 2D array of detectors. The detectors produce an indication of the distance to the closest object in an associated portion of the environment. A processor receives the indications from the infrared sensor to determine a user action. The processor interprets the action as an input to a computer game. The processor provides the input to the computer game.

One embodiment of the present invention is a music keyboard system including an infrared sensor. The infrared sensor includes an infrared light source to produce pulses of infrared light, optics to focus reflections from the infrared light pulse from different portions of the environment to different detectors in a 2D array of detectors. The detectors produce indications of the distances to the closest objects in associated portions of the environment. A processor receives the indications from the infrared sensor to determine a user selected music keyboard key. The processor then initiates the production of a musical sound corresponding to the music keyboard key.

DETAILED DESCRIPTION

Figure 1:
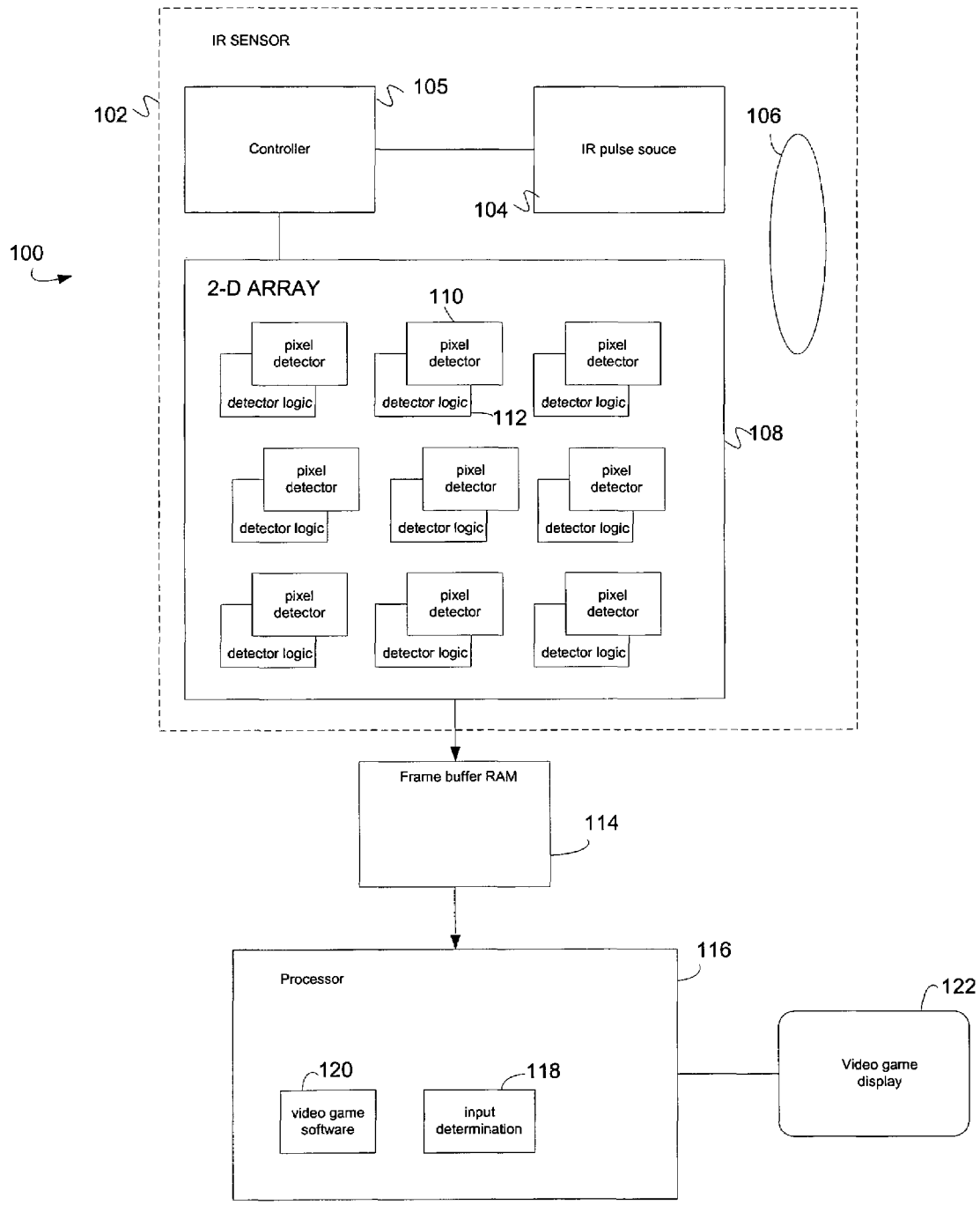
FIG. 1 is a diagram that illustrates a computer game system of one embodiment of the present invention.

One embodiment of the present invention is computer game system, such as the computer game system 100 shown in FIG. 1. The computer system can be a personal computer (PC) or a console based system or other type of computer game system.

An infrared sensor 102 includes an infrared light source 104. The infrared light source 104 can produce pulses of infrared light. The infrared light sensor 102 includes optics 106 to focus reflections from an infrared light source pulse from different portions of the environment to different detectors in a two dimensional (2D) array of the detectors 108. The optics 106 can include a single or multiple optical elements. In one embodiment, the optics 106 focus light reflected from different regions of the environment to the detectors in the 2D array 108. The detectors produce indications of the distances to the closest objects in associated portions of the environment. In the example of FIG. 1, the 2D array includes pixel detectors 110 and associated detector logic 112. In one embodiment, the 2D array of detectors is constructed using CMOS technology on a semiconductor substrate. The pixel detectors can be photodiodes. The detector logic 112 can include counters. In one embodiment, a counter for a pixel detector runs until a reflected pulse is received. The counter value thus indicates the time for the pulse to be sent from the IR sensor and reflected back from an object in the environment to the pixel detector. Different portions of environment with different objects will have different pulse transit times.

In one embodiment, each detector produces an indication of the distance to the closest object in the associated portion of the environment. Such indications can be sent from the 2D detector array 108 to a memory such as the Frame Buffer RAM 114 that stores frames of the indications. A frame can contain distance indication data of the pixel detectors for a single pulse.

Controller 105 can be used to initiate the operation of the IR pulse source 104 as well as to control the counters in the 2D detector array 108.

An exemplary infrared sensor for use in the present invention is available from the Canesta, Inc. of San Jose, Calif. Details of such infrared sensors are described in the U.S. Pat. No. 6,323,932 and published patent applications US 2002/0140633 A1, US 2002/0063775 A1, US 2003/0076484 A1 each of which are incorporated herein by reference.

The processor 116 can receive the indications from the infrared sensor 108 from the infrared sensors 102 to determine a user action. In example of FIG. 1, the indication of the object distances are stored in frames in the Frame Buffer RAM 114 then provided to the processor 106. The processor 106 can use the frames of indication data to determine a user action and interpret the action as input to a computer game.

In the example of FIG. 1, input determination software 118 running on the processor 116 can determine a computer game user input based on the distance indications. The processor 116 can provide the input to the computer game. In one embodiment, the input to the computer game can then be used to modify the computer game operation.

Figure 2:
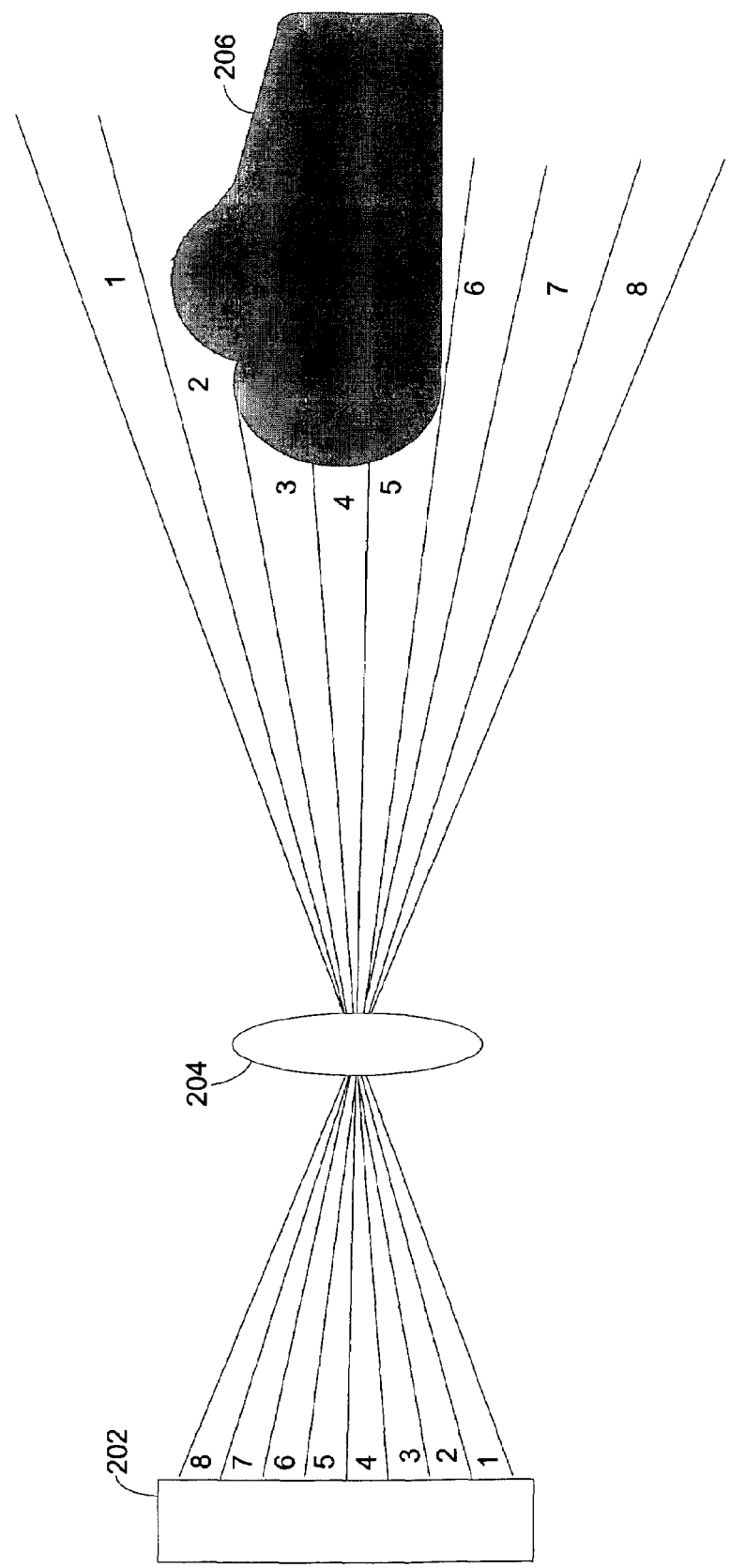
FIG. 2 is a diagram that illustrates cross-sectional view of the operation of an infrared sensor used in a computer game system of one embodiment of the present invention.

FIG. 2 illustrates the operation of a cross-section of the 2D detector array. In the example of FIG. 2, the 2D array detectors 206 and optics 204 are used to determine the location of the object 206 within the environment. In this example, reflections are received from regions 2, 3, 4 and 5. The time to receive these reflections can be used to determine the position of the closest object within the region of the environment.

Figure 3:
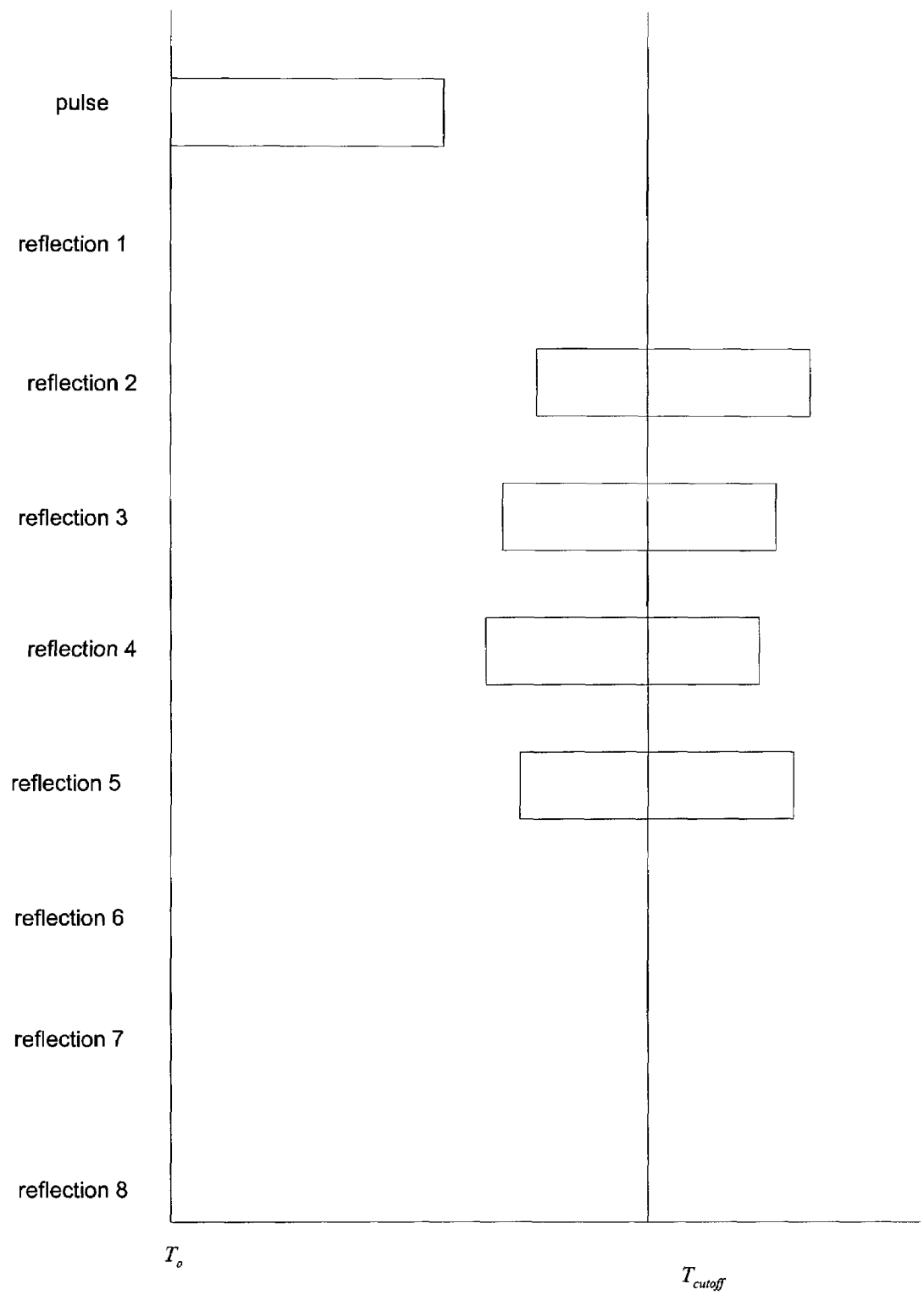
FIG. 3 is a diagram that illustrates an examples of reflected pulses used with example of FIG. 2.

In the example of FIG. 3, a pulse is created and is sent to all of the regions 1 to 8 shown in FIG. 2. Regions 1, 6, 7 and 8 do not reflect the pulses to the sensor; regions 2, 3, 4, and 5 do reflect the pulses to the sensor. The time to receive the reflected pulse can indicate the distance to an element.

In one embodiment, the system measures the reflected pulse duration or energy up to a cutoff time, $t_{cutoff}$. This embodiment can reduce the noise in some situations.

In one embodiment, the input device examines the position of an arm, hand or other object placed within a operating region of the infrared sensor. The distance indications from the 2D detector give a two-dimensional mapping of the closest object within the different portions of the environment. Different regions within the operating region of the infrared sensor can have different meanings. For example, in a boxing game, a fist may need to go a certain distance within a two dimensional region to be considered a hit. In one example, a number of the pixel detectors correspond to a torso locations imagined to be a specific distance from the infrared sensor. If a users fist reaches the pixel detector locations corresponding to the distance to the torso, a hit can be scored. The regions such as the torso locations can be actively modified in the video game. Defensive positioning of the users hands can also be determined and can thus affect the gameplay.

The changing game conditions and thus the changes to the evaluation of user actions can be indicated on a video game display 112. For example, a digital opponent shown in a video game display 122 can move around and parry with its hands such that a punch is in the same region of the environment may result in a blocked shot or miss which earlier which would result in a scored hit.

The boxing game is a simple example of a video game that uses the input device of the present invention. Other types of games can also use the input controller. In one embodiment, hand signals are interrupted as control gestures for the computer game. In one embodiment, different portions of the infrared display region correspond to different elements on an input controller.

Alternately, hand orientation, shape or changes in the movement of the user's hands or other object can be associated with an input. The distance indications can be used to be determined the location of an object or a location of a hand. Changes in the position and orientation of the hand can be determined and used as input. For example, a fist can have a one input value, a palm face forward can have another input value, a handshake position yet another input value. Movement of the hand up, down, left, right in out can have other input values.

The video games 120 can be conventional video games in which the input determination software 118 is supplemental or the video game can be integrated into the computer game system.

Figure 4:
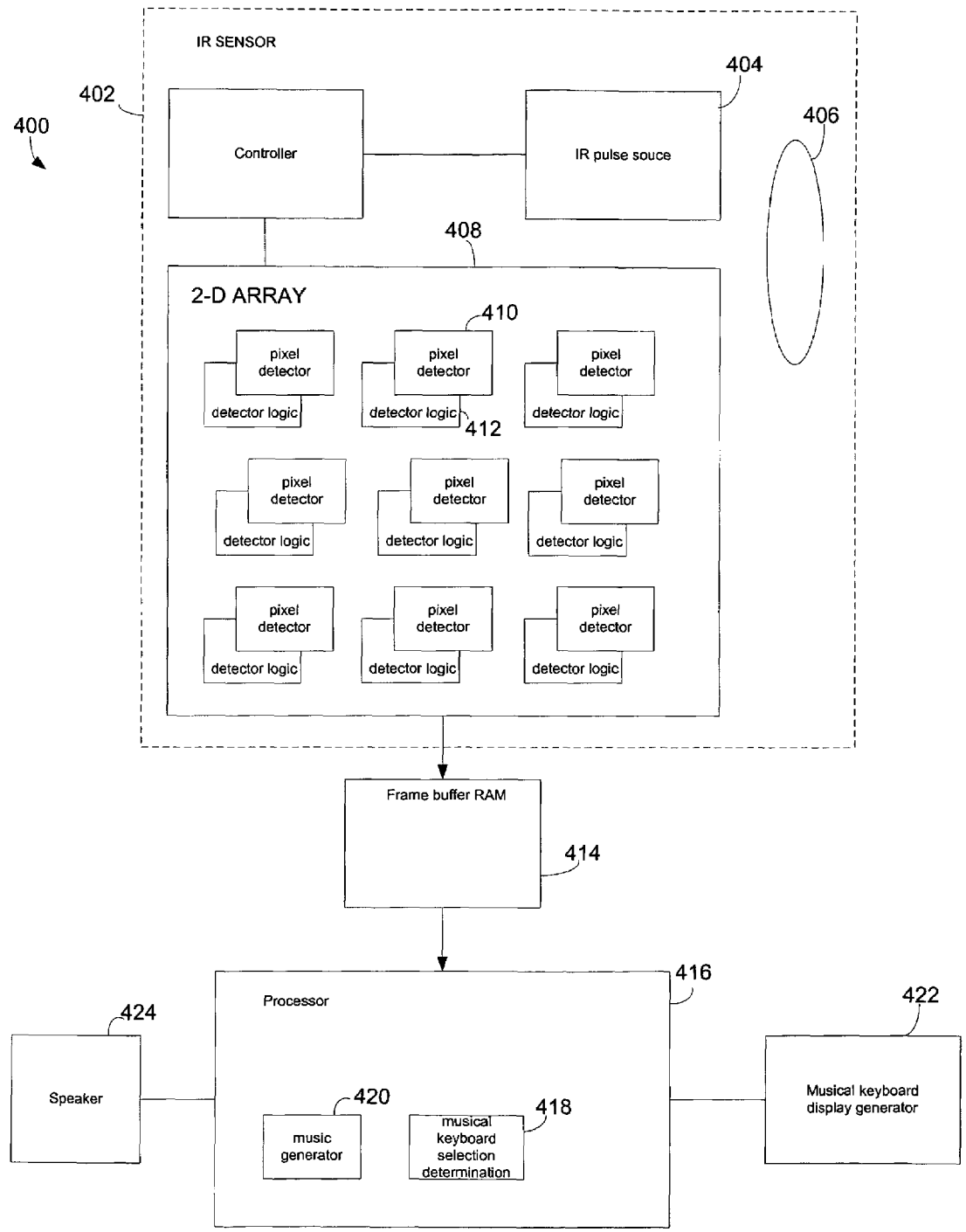
FIG. 4 is a diagram that illustrates a music keyboard system using an infrared sensor of one embodiment of the present invention.

FIG. 4 illustrates a musical keyboard system 400 of one embodiment of the present invention. The musical keyboard system includes the infrared sensor 402. The infrared sensor 402 can include an infrared light source 404 that produces pulses of infrared light and optics 406 to focus reflections from the infrared light pulse from different portions of the environment to different detectors in a 2D array of detectors 408. The detectors 410 produce indications of the distance of the closest object in an associated portion of the environment. In this example, the sensors include the pixel detector 410 and detector logic 412. In one embodiment, the distance indications are stored in a memory such as Frame Buffer RAM 414. A processor 416 receives the indications from the infrared sensor to determine a user selected musical keyboard key. The processor initiates the production of musical sound corresponding to the musical keyboard key. In one embodiment, a musical keyboard display generator 422 is used to produce a display of musical keyboard. The display can be a projected image. Alternately, a printed keyboard can be used. The processor 416 can run musical keyboard selection determination software 418 to determine the key selected by the user. Each musical keyboard key is associated with a number of detectors in the 2D array. In one embodiment, the system tracks the user's finger and then determines when a button is pressed when user's finger goes into a region close to the musical keyboard key. Alternately, the user's finger can be tracked to indicate a user fingertip position. The tip velocity can be tracked such that abrupt changes in the velocity that occurs when the user contacts a surface can be determined. In one embodiment, the musical generator 420 produces a sound corresponding to the musical keyboard key. The sounds can be sampled musical keyboard sounds, such as piano sounds, or the keyboard system can be used along with music synthesizer in which the different keyboards can produce a variety of different sounds. In one embodiment, the sounds are provided to the speaker 424.

Figure 5:
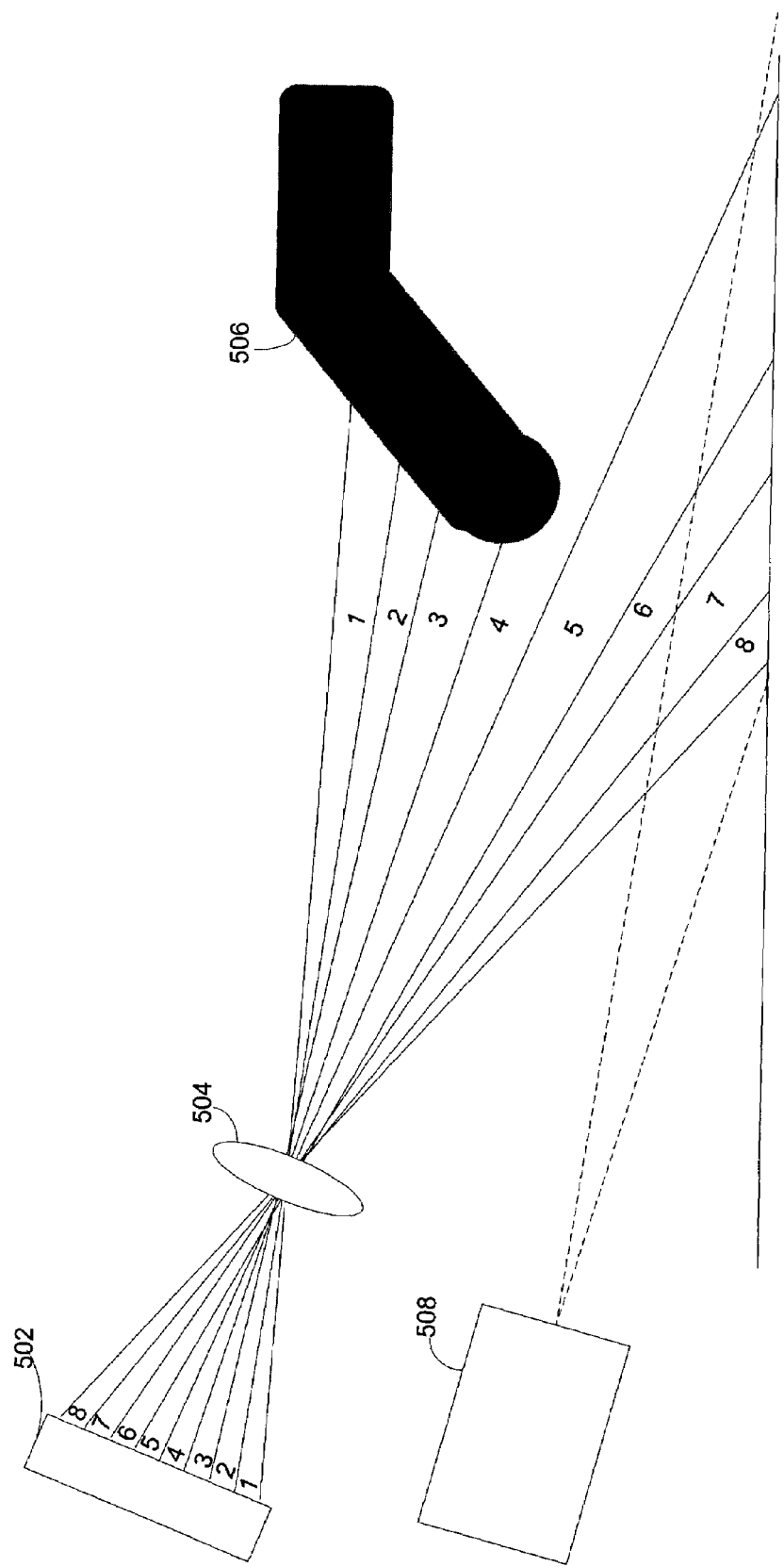
FIG. 5 is a diagram that illustrates the operation of a musical keyboard system of one embodiment of the present invention.

FIG. 5 illustrates a one-dimensional slice of the IR sensor system. In this example the 2D array detector 502 and optics 504 are used to detect the position of the user finger 506 in a variety of different regions are provided. The musical keyboard display generator 508 can be used to produce a display of the key of the keyboard.

Figure 6:
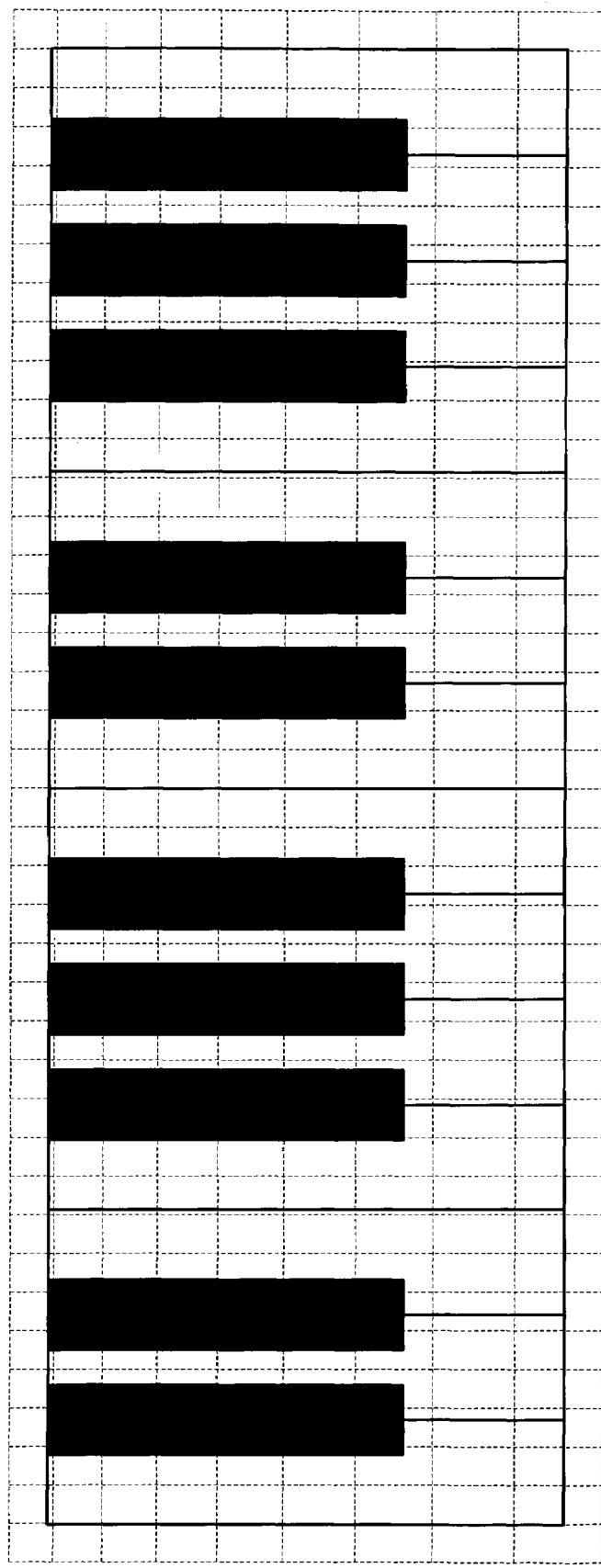
FIG. 6 is a diagram that illustrates an example of a musical keyboard display of one embodiment of the present invention

FIG. 6 illustrates an example on which a display of a musical keyboard includes a number of detector regions for detecting finger position.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A music keyboard system comprising:
    an infrared sensor, the sensor including an infrared light source to produce pulses of infrared light, optics to focus reflections from the infrared light pulse from different portions of the environment to different detectors in a 2D array of detectors, the detectors producing indications of the distances to the closest objects in associated portions of the environment;

a processor receiving the indications from the infrared sensor to determine a user selected music keyboard key, the processor initiating the production of a musical sound corresponding to the music keyboard key; and a musical keyboard display generator, wherein the musical keyboard display generator produces a projected light display.

2. The music keyboard system of claim 1, further comprising a speaker for producing the musical sound.

3. The music keyboard system of claim 1, wherein the indications are used to determine a user's finger touching a musical keyboard location.

4. The music keyboard system of claim 1, wherein the indications are used to determine a user's finger position.

5. The music keyboard system of claim 1, wherein the indications are used to determine a user's finger velocity.

6. A music keyboard system comprising:

an infrared sensor, the sensor including an infrared light source to produce pulses of infrared light, optics to focus reflections from the infrared light pulse from different portions of the environment to different detectors in a 2D array of detectors, the detectors producing indications of the distances to the closest objects in associated portions of the environment, the indications being used to determine a user's finger touching a musical keyboard key location;

a processor receiving the indications from the infrared sensor to determine a user selected music keyboard key, the processor initiating the production of a musical sound corresponding to the music keyboard key; and a musical keyboard display generator.

7. The music keyboard system of claim 6, further comprising a speaker operable to produce the musical sound.

8. The music keyboard system of claim 6, wherein the musical keyboard display generator is configured to produce a projected light display.

9. The music keyboard system of claim 6, wherein the indications are configured to determine a user's finger position.

10. The music keyboard system of claim 6, wherein the indications are configured to determine a user's finger velocity.

11. A music keyboard system comprising:

an infrared sensor, the sensor including an infrared light source to produce pulses of infrared light, optics to focus reflections from the infrared light pulse from different portions of the environment to different detectors in a 2D array of detectors, the detectors producing indications of the distances to the closest objects in associated portions of the environment, the indications being used to determine a user's finger position;

a processor receiving the indications from the infrared sensor to determine a user selected music keyboard key, the processor initiating the production of a musical sound corresponding to the music keyboard key; and a musical keyboard display generator.

12. The music keyboard system of claim 11, further comprising a speaker operable to produce the musical sound.

13. The music keyboard system of claim 11, wherein the musical keyboard display generator is configured to produce a projected light display.

14. The music keyboard system of claim 11, wherein the indications are configured to determine a user's finger touching a musical keyboard key location.

15. The music keyboard system of claim 11, wherein the indications are configured to determine a user's finger velocity.

16. A music keyboard system comprising:

an infrared sensor, the sensor including an infrared light source to produce pulses of infrared light, optics to focus reflections from the infrared light pulse from different portions of the environment to different detectors in a 2D array of detectors, the detectors producing indications of the distances to the closest objects in associated portions of the environment, the indications being used to determine a user's finger velocity;

a processor receiving the indications from the infrared sensor to determine a user selected music keyboard key, the processor initiating the production of a musical sound corresponding to the music keyboard key; and a musical keyboard display generator.

17. The music keyboard system of claim 16, further comprising a speaker operable to produce the musical sound.

18. The music keyboard system of claim 16, wherein the musical keyboard display generator is configured to produce a projected light display.

19. The music keyboard system of claim 16, wherein the indications are configured to determine a user's finger touching a musical keyboard key location.

20. The music keyboard system of claim 16, wherein the indications are configured to determine a user's finger position.

* * * * *